(12) United States Patent
Liu et al.

(10) Patent No.: US 12,520,872 B2
(45) Date of Patent: Jan. 13, 2026

(54) AIR HEATING ASSEMBLY, HEATING MODULE, CONTROLLABLE HEATING MODULE, AND ELECTRONIC CIGARETTE DEVICE

(71) Applicant: HUIZHOU PEGASUS TECHNOLOGY CO., LTD., Guangdong (CN)

(72) Inventors: Liu Liu, Guangdong (CN); Huabin Yan, Guangdong (CN)

(73) Assignee: HUIZHOU PEGASUS TECHNOLOGY CO., LTD., Guangdong (CN)

(*) Notice: Subject to any disclaimer, the term of this patent is extended or adjusted under 35 U.S.C. 154(b) by 299 days.

(21) Appl. No.: 17/040,658

(22) PCT Filed: Jun. 3, 2019

(86) PCT No.: PCT/CN2019/089882
§ 371 (c)(1),
(2) Date: Sep. 23, 2020

(87) PCT Pub. No.: WO2020/199339
PCT Pub. Date: Oct. 8, 2020

(65) Prior Publication Data
US 2022/0046989 A1 Feb. 17, 2022

(30) Foreign Application Priority Data
Apr. 2, 2019 (CN) .......................... 201910263462.5

(51) Int. Cl.
*A24F 40/46* (2020.01)
*A24F 40/20* (2020.01)
(Continued)

(52) U.S. Cl.
CPC .............. *A24F 40/46* (2020.01); *A24F 40/20* (2020.01); *A24F 40/485* (2020.01); *A24F 40/51* (2020.01);
(Continued)

(58) Field of Classification Search
None
See application file for complete search history.

(56) References Cited

U.S. PATENT DOCUMENTS 4,357,526 A * 11/1982 Yamamoto ............. H05B 3/148
361/266
5,498,855 A * 3/1996 Deevi ..................... A24F 40/46
131/194
(Continued)

FOREIGN PATENT DOCUMENTS

| CN | 104146353 A | 11/2014 |
|---|---|---|
| CN | 206079021 U | 4/2017 |

(Continued)

OTHER PUBLICATIONS

Liu et al., machine translation CN 208192149 Description, Dec. 7, 2018 (Year: 2018).*

(Continued)

*Primary Examiner* — Melvin C. Mayes
(74) *Attorney, Agent, or Firm* — Rivka Friedman

(57) ABSTRACT

A heating module is provided by the present application, which includes a heat insulating tube, wherein a ventilation separator dividing the heat insulating tube into an upper tube chamber and a lower tube chamber is disposed therein, and a plurality of air guiding holes are provided in the ventilation separator, and an air intake structure is configured in the lower tube chamber; a receiving tube disposed inside the
(Continued)

upper tube chamber, and an air heating assembly, wherein the air heating assembly is disposed inside the lower tube chamber.

6 Claims, 13 Drawing Sheets

(51) Int. Cl.
- *A24F 40/485* (2020.01)
- *A24F 40/51* (2020.01)
- *A24F 40/57* (2020.01)
- *F24H 3/00* (2022.01)
- *H05B 3/06* (2006.01)
- *H05B 3/44* (2006.01)

(52) U.S. Cl.
CPC .............. *A24F 40/57* (2020.01); *F24H 3/002* (2013.01); *H05B 3/06* (2013.01); *H05B 3/44* (2013.01); *F24H 2250/02* (2013.01); *H05B 2203/002* (2013.01)

(56) References Cited

U.S. PATENT DOCUMENTS

| | | | |
|---|---|---|---|
| 10,736,358 B2 | 8/2020 | Ding | |
| 2015/0047661 A1* | 2/2015 | Blackley | A24F 40/90 392/387 |
| 2016/0081394 A1* | 3/2016 | Alarcon | A24F 40/40 131/328 |
| 2019/0191769 A1* | 6/2019 | Qiu | A24F 40/485 |
| 2019/0216132 A1* | 7/2019 | Phan | C03B 19/06 |
| 2020/0367564 A1* | 11/2020 | Li | A24F 40/44 |

FOREIGN PATENT DOCUMENTS

| | | | | |
|---|---|---|---|---|
| CN | 107890139 A | * | 4/2018 | ........... A24F 47/008 |
| CN | 108741230 A | | 11/2018 | |
| CN | 108968163 A | | 12/2018 | |
| CN | 208192149 U | | 12/2018 | |
| CN | 208510068 U | | 2/2019 | |
| CN | 209732600 U | * | 12/2019 | |
| WO | WO 2015/192300 A1 | * | 12/2015 | ............. C04B 35/14 |
| WO | 2018195901 A1 | | 11/2018 | |
| WO | WO 2020/098544 A1 | * | 5/2020 | ............. A24F 40/70 |

OTHER PUBLICATIONS

CN-208510068-U (Year: 2019).*
CN208510068U, A air heating unit and this low temperature cigarette for low temperature cigarette, (Year: 2019).*

* cited by examiner

13

AIR HEATING ASSEMBLY, HEATING MODULE, CONTROLLABLE HEATING MODULE, AND ELECTRONIC CIGARETTE DEVICE

BACKGROUND OF INVENTION

Field of Invention

The present application relates to electronic cigarettes field, and particularly relates to an air heating assembly, a heating module, a controllable heating module, and an electronic cigarette device.

Description of Prior Art

In prior art, heating is generally performed by inserting heating sheets or heating pins into cut tobacco portions of to-be-heated cigarettes in heat not burning electronic cigarette devices and combustion electronic cigarette devices. Each of the heating sheets and the heating pins has a certain physical shape and a certain volume. After the heating element are inserted into the cut tobacco portions of the cigarettes, arrangement of cut cigarettes in the cut cigarette portions is disrupted, resulting in nonuniformity of smoking strength and heating, and further inducing inconsistent flavor and poor product experience.

SUMMARY OF INVENTION

An air heating assembly, a heating module, a controllable heating module and an electronic cigarette device are provided by the present application, which can solve the problems of inconsistent flavor and poor product experience induced by nonuniformity of smoking strength and heating.

An air heating assembly is provided by one embodiment of the present application, which comprises:
  a heat retention part, wherein a plurality of air heating passages are arranged in the heat retention part; and
  a heating element, wherein the heating element is disposed on the heat retention part, and the heating element is configured to heat gas passing by the air heating passages.

In the air heating assembly of the present application, the heat retention part comprises a first end and a second end disposed opposite to each other, and each of the air heating passage passes through the heat retention part along a direction from the first end to the second end.

In the air heating assembly of the present application, each of the air heating passage is defined as a through hole provided in the heat retention part.

In the air heating assembly of the present application, each of the air heating passage is defined as a concave provided in a sidewall of the heat retention part.

In the air heating assembly of the present application, the heating element is disposed inside the heat retention part, the heating element is a metal heating coil, and the metal heating coil is configured to be a hollow spiral pipe shape.

In the air heating assembly of the present application, the heating element is disposed on an outer surface of the heat retention part, the heating element is a resistance heating circuit, and the resistance heating circuit is coated on the outer surface of the heat retention part.

In the air heating assembly of the present application, the heat retention part and the heating element are integrally formed.

In the air heating assembly of the present application, the air heating assembly further comprises a supporting tube and a heat insulating layer; the supporting tube is disposed around an outer surface of the heat retention part; and the heat insulating layer is disposed between the supporting tube and the heat retention part.

A heating module applied in an electronic cigarette device is also provided by another embodiment of the present application, wherein the heating module comprises:
  a heat insulating tube, wherein a ventilation separator is disposed inside the heat insulating tube, the ventilation separator divides the heat insulating tube into an upper tube chamber and a lower tube chamber, and a plurality of air guiding holes configured to connect the upper tube chamber with the lower tube chamber are provided in the ventilation separator, and an air intake structure configured for entry of external air is configured in the lower tube chamber;
  a receiving tube, wherein the receiving tube is disposed inside the upper tube chamber and configured for a cigarette to insert in, and
  an air heating assembly, wherein the air heating assembly comprises:
  a heat retention part, wherein a plurality of air heating passages are arranged in the heat retention part; and
  a heating element, wherein the heating element is disposed on the heat retention part and the heating element is configured to heat gas passing by the air heating passages;
  wherein the air heating assembly is disposed inside the lower tube chamber and configured to heat air inhaled into the lower tube chamber through the air intake structure to a default temperature to allow the heated air to enter the receiving tube through the air guiding holes to heat the cigarette to produce smoke.

In the heating module of the present application, an end of the heat retention part abuts against the ventilation separator, and another end of the heat retention part abuts against the air intake structure.

In the heating module of the present application, the air intake structure is inserted in an end of the lower tube chamber away from the upper tube chamber and abuts against an end portion of the heat retention part.

In the heating module of the present application, an air intake opening is provided in the air intake structure, and the air intake opening is connected with the air heating passages.

In the heating module of the present application, a sealing cap is disposed between an outer sidewall of the air intake structure and an inner sidewall of the lower tube chamber.

In the heating module of the present application, the air heating assembly further comprises a supporting tube and a heat insulating layer; the supporting tube is disposed around an outer surface of the heat retention part; and the heat insulating layer is disposed between the supporting tube and the heat retention part.

An electronic cigarette device is also provided by embodiments of the present application, comprising a heating module, wherein the heating module comprises:
  a heat insulating tube, wherein a ventilation separator is disposed inside the heat insulating tube, the ventilation separator divides the heat insulating tube into an upper tube chamber and a lower tube chamber, and a plurality of air guiding holes configured to connect the upper tube chamber with the lower tube chamber are provided in the ventilation separator, and an air intake structure configured for entry of external air is configured in the lower tube chamber;

a receiving tube, wherein the receiving tube is disposed inside the upper tube chamber and configured for a cigarette to insert in, and an air heating assembly, wherein the air heating assembly comprises:

a heat retention part, wherein a plurality of air heating passages are arranged in the heat retention part; and a heating element, wherein the heating element is disposed on the heat retention part and the heating element is configured to heat gas passing by the air heating passages;

the air heating assembly is disposed inside the lower tube chamber and is configured to heat air inhaled into the lower tube chamber through the air intake structure to a default temperature to allow the heated air to enter the receiving tube through the air guiding holes to heat the cigarette to produce smoke; and wherein the electronic cigarette device further comprises:

a power supply module, wherein the power supply module is connected with and supplies power to the heating module.

In the electronic cigarette device of the present application, the power supply module comprises a driving circuit and a battery assembly; the battery assembly is connected with the driving circuit, and the driving circuit is electrically connected with a driving assembly.

In the electronic cigarette device of the present application, an end of the heat retention part abuts against the ventilation separator, and another end of the heat retention part abuts against the air intake structure.

In the electronic cigarette device of the present application, the air intake structure is inserted in an end of the lower tube chamber away from the upper tube chamber and abuts against an end portion of the heat retention part.

In the electronic cigarette device of the present application, an air intake opening is provided in the air intake structure and the air intake opening is connected with the air heating passages.

In the electronic cigarette device of the present application, a sealing cap is disposed between an outer sidewall of the air intake structure and an inner sidewall of the lower tube chamber.

In the air heating assembly, the heating module, the controllable heating module and the electronic cigarette device provided by embodiments of the present application, the air is heated to a default temperature by the air heating assembly, and the heated air is used to heat cigarettes to improve heating uniformity, so that local overheating can be prevented, thus improving taste and user's experience.

BRIEF DESCRIPTION OF DRAWINGS

In order to more clearly illustrate the technical solution of the present application, a brief description of the drawings that are necessary for the illustration of the embodiments will be given as follows. Obviously, the drawings described below show only some embodiments of the present invention, and a person having ordinary skill in the art may also obtain other drawings based on the drawings described without making any creative effort.

DETAILED DESCRIPTION OF PREFERRED EMBODIMENTS

Figure 1:
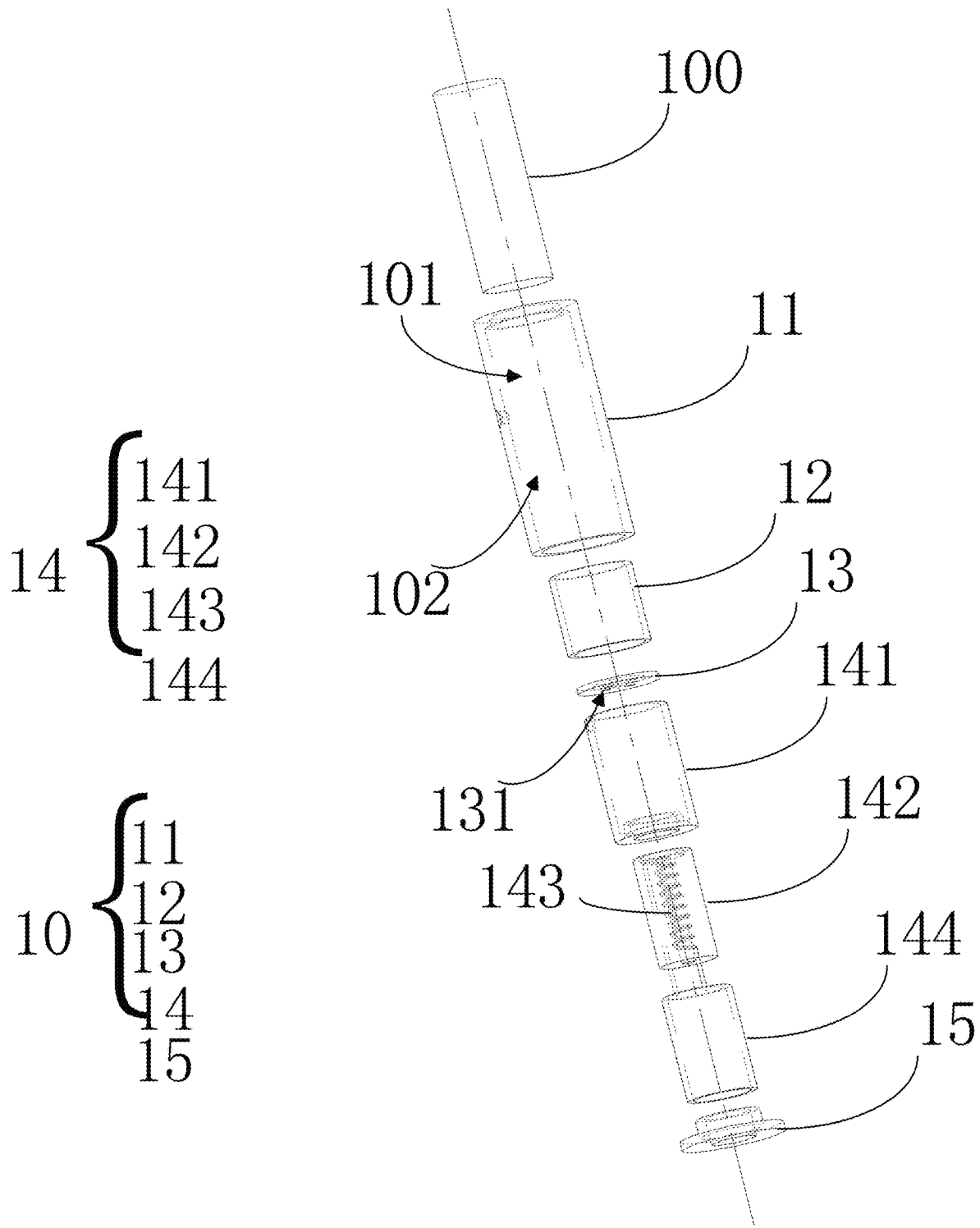
FIG. 1 is an exploded structural schematic diagram of a heating module according to one embodiment of the present application.

The present disclosure is further described in detail below with reference to the accompanying drawings and embodiments. Obviously, the following described embodiments are only part of the present disclosure but not all. A person having ordinary skill in the art may obtain other embodiments based on the embodiments provided in the present disclosure without making any creative effort, which all belong to the scope of the present disclosure.

In descriptions of the present application, it is to be understood that terms such as "center", "longitudinal", "transverse", "length", "width", "thickness", "up", "down", "front", "back", "left", "right", "vertical", "horizontal", "top", "bottom", "inside", "outside", "clockwise", "counterclockwise" should be construed to refer to the orientation as then described or as shown in the drawings under discussion. These relative terms are for convenience of description and do not require that the present disclosure be constructed or operated in a particular orientation, which may not be understood to limit the present disclosure.

Figure 2:
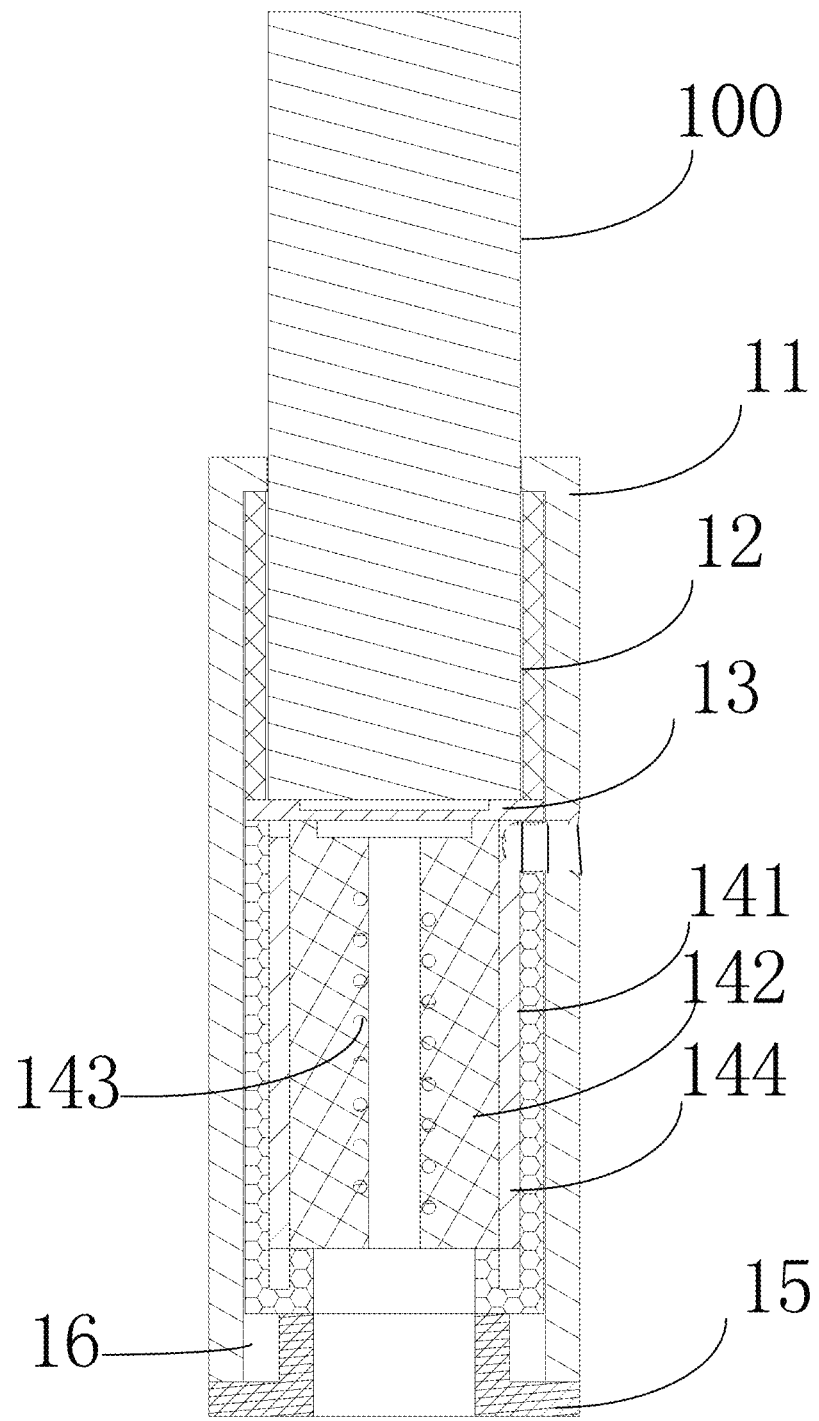
FIG. 2 is a cross-sectional view of a heating module according to one embodiment of the present application.
Figure 3:
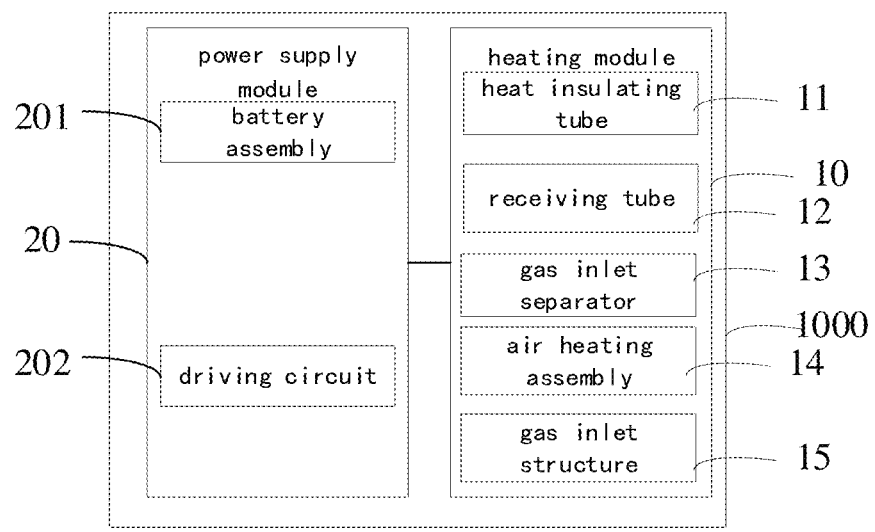
FIG. 3 is a structural schematic diagram of an electronic cigarette device according to one embodiment of the present application.

Please refer to FIGS. 1 to 3, FIG. 1 is an exploded structural schematic diagram of a heating module according to one embodiment of the present application. FIG. 2 is a cross-sectional view of a heating module according to one embodiment of the present application. FIG. 3 is a structural schematic diagram of an electronic cigarette device according to one embodiment of the present application. Combining what is illustrated in FIG. 1 to FIG. 3, a heating module 10 of one embodiment of the present application is applied in an electronic cigarette device 1000, and the heating module 10 and a power supply module 20 is assembled to form the electronic cigarette device 1000. The heating module 10 is configured to heat air to a default temperature and the heated air is configured to heat a cigarette 100 to produce smoke.

In this embodiment, the heating module 10 includes a heat insulating tube 11, a receiving tube 12, a ventilation separator 13, an air heating assembly 14 and an air intake structure 15. The ventilation separator 13 is disposed inside the heat insulating tube 11, the ventilation separator 13 divides the heat insulating tube 11 into an upper tube chamber 101 and a lower tube chamber 102, and a plurality of air guiding holes 131 configured to connect the upper tube chamber 101 with the lower tube chamber 102 are provided in the ventilation separator 13, and an air intake structure 15 configured for entry of external air is configured in the lower tube chamber 102. The receiving tube 12 is disposed inside the upper tube chamber 101 for the cigarette 100 to insert in. The air heating assembly 14 is disposed inside the lower tube chamber 102 and configured to heat the air inhaled into the lower tube chamber 102 through the air intake structure 15 to a default temperature to allow the heated air to enter the receiving tube 12 through the air guiding holes 131 to heat the cigarette 100 to produce smoke.

Figure 4:
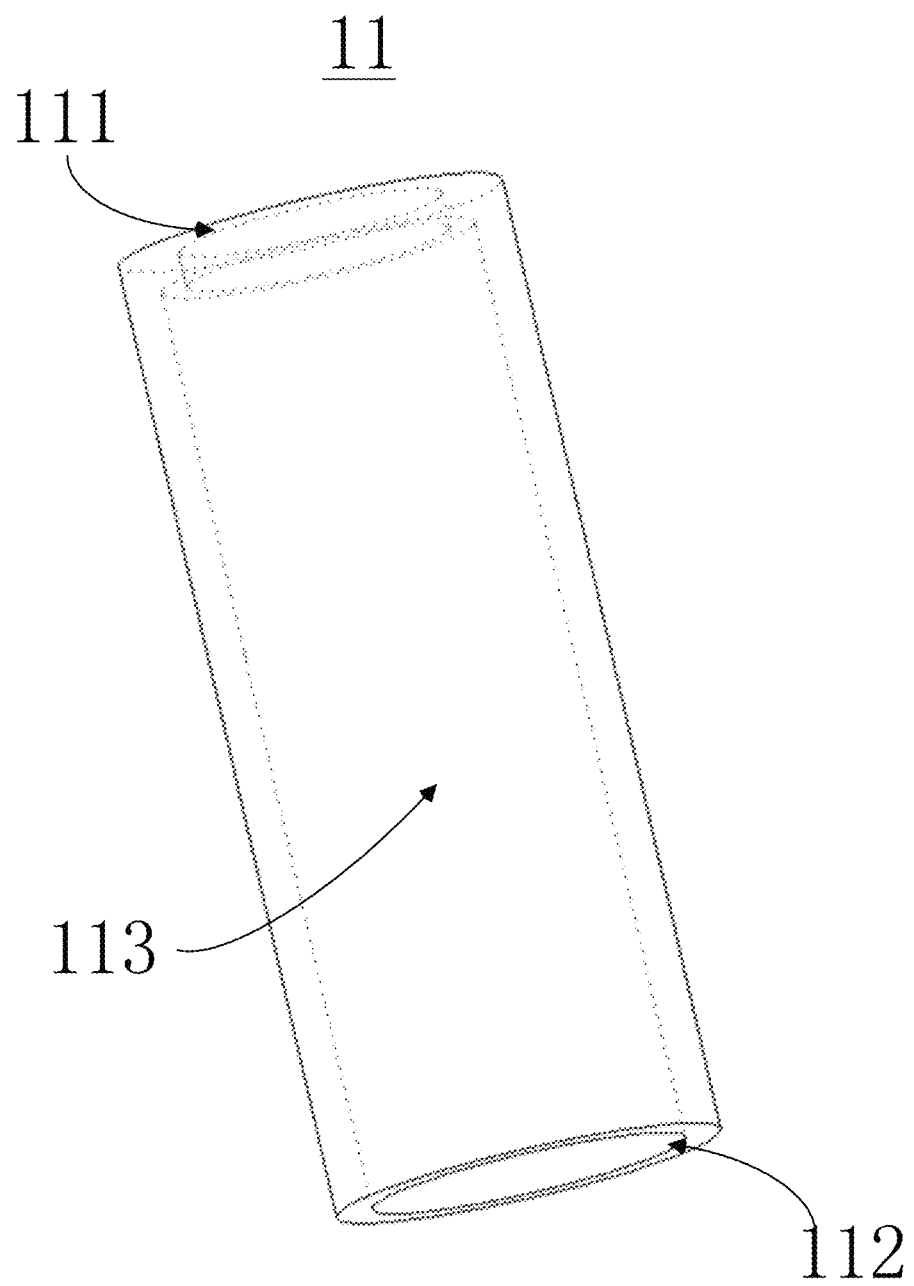
FIG. 4 is an enlarged view of a heat insulating tube according to one embodiment of the present application.

The heat insulating tube 11 is configured to have a hollow cylinder structure so that the receiving tube 12, the ventilation separator 13 and the air heating assembly 14 can be disposed inside the heat insulating tube 11. The heat insulating tube 11 can be made of plastic materials of high temperature resistance, which is conducive to heat insulation and heat preservation. Furthermore, combining with FIG. 4, FIG. 4 is an enlarged view of a heat insulating layer according to one embodiment of the present application. The heat insulating tube 11 includes a first heat insulating end 111, a second heat insulating end 112 and a heat insulating tunnel 113, the heat insulating tunnel 113 passes through the heat insulating tube 11 along a direction from the first heat insulating end 111 to the second heat insulating end 112. Wherein the first heat insulating end 111 of the heat insulating tube 11 is an end for cigarette to insert in, and the air intake structure 15 is inserted in the second heat insulating end 112 of the heat insulating tube 11.

It can be understood that in one embodiment, a limiting structure (not shown in the figures) can be further configured in the heat insulating tube 11, the receiving tube 12, the ventilation separator 13, the air heating assembly 14 and the air intake structure 15 can be fixed to the heat insulating tube 11 by the limiting structure. And the receiving tube 12, the ventilation separator 13, the air heating assembly 14 and the air intake structure 15 can be removed from the heat insulating tube 11 by operating the limiting structure so as to clean the receiving tube 12, the ventilation separator 13, the air heating assembly 14 and the air intake structure 15 to improve tidiness of product.

Figure 5:
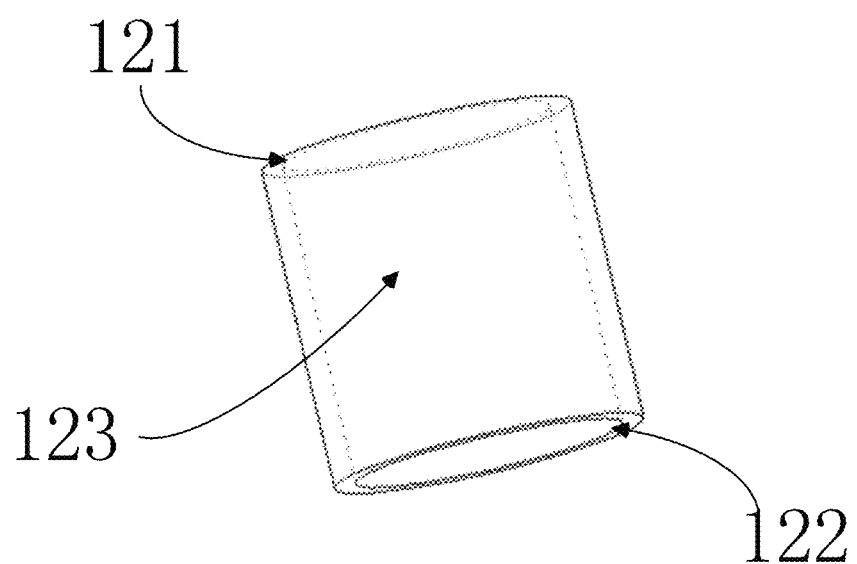
FIG. 5 is an enlarged view of a receiving tube according to one embodiment of the present application.

Combining with FIG. 5, FIG. 5 is an enlarged view of a receiving tube according to one embodiment of the present application. Accordingly, the receiving tube 12 is also configured to have a hollow cylinder structure so as to match the heat insulating tube 11, therefore the receiving tube 12 is mounted inside the upper tube chamber 101 of the heat insulating tube 11 and configured for the cigarette 100 to insert in. The receiving tube 12 can be made of alumina or zirconia ceramics, which is easy to clean and high temperature resistant. Furthermore, the receiving tube 12 includes a first receiving end 121, a second receiving end 122 and a receiving tunnel 123, the receiving tunnel 123 passes through the receiving tube 12 along a direction from the first receiving end 111 to the second receiving end 122. Wherein, the first receiving end of the receiving tube 12 is aligned with the first heat insulating end 111 of the heat insulating tube 11, the first receiving end 121 of the receiving tube 12 is an end provided for the cigarette to insert in, and the second receiving end 122 of the receiving tube 12 abuts against the ventilation separator 13.

Figure 6:
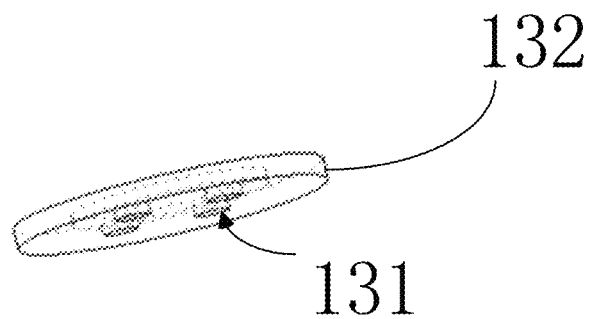
FIG. 6 is an enlarged view of a ventilation separator according to one embodiment of the present application.

Combining with FIG. 6, FIG. 6 is an enlarged view of a ventilation separator according to one embodiment of the present application. The ventilation separator 13 is configured to prevent residual cigarette 100 inserted in the receiving tube 12 from falling into the air heating assembly 14, and allow the air heated by the air heating assembly 14 to pass there through and enter the receiving tube 12 to heat the cigarette 100 to produce smoke. The ventilation separator 13 can be made of zirconia. Specifically, the ventilation separator 13 can be configured to have a structure of a circular sheet. The ventilation separator 13 includes a main body 132 and a plurality of air guiding holes 131 provided in the main body 132, so as to allow the air heated by the air heating assembly 14 enter the receiving tube 12 through the air guiding holes 131 to heat the cigarette 100 to produce smoke.

It can be understood that in one embodiment, a diameter of the air guiding holes 131 of the ventilation separator 13 is 0.5 mm to 1 mm to ensure that residual cigarette 100 inserted in the receiving tube 12 do not fall into the air heating assembly 14, and ensure that the air heated by the air heating assembly 14 enters the receiving tube 12 through the air guiding holes 131 to heat the cigarette 100 to produce smoke. In another embodiment, the air guiding holes 131 of the ventilation separator 13 are arranged uniformly so as to allow the air heated by the air heating assembly 14 enter the receiving tube 12 more uniformly to heat the cigarette 100 to produce smoke.

The air heating assembly 14 is disposed inside the lower tube chamber 102 of the heat insulating tube 11, that is to say, one end of the air heating assembly 14 abuts against the ventilation separator 13 and another end of the air heating assembly 14 abuts against the air intake structure 15. The air heating assembly 14 is configured to heat the air inhaled into the lower tube chamber 102 through the air intake structure 15 to a default temperature to allow the heated air to enter the receiving tube 12 through the air guiding holes 131 to heat the cigarette 100 to produce smoke.

Figure 7:
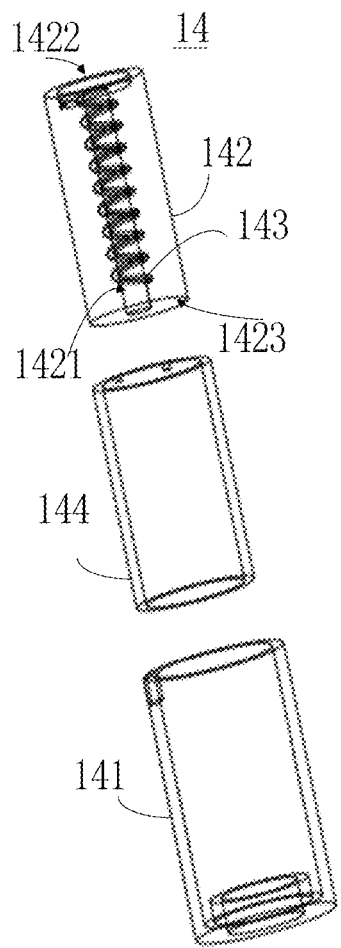
FIG. 7 is an enlarged view of an air heating assembly according to one embodiment of the present application.
Figure 8:
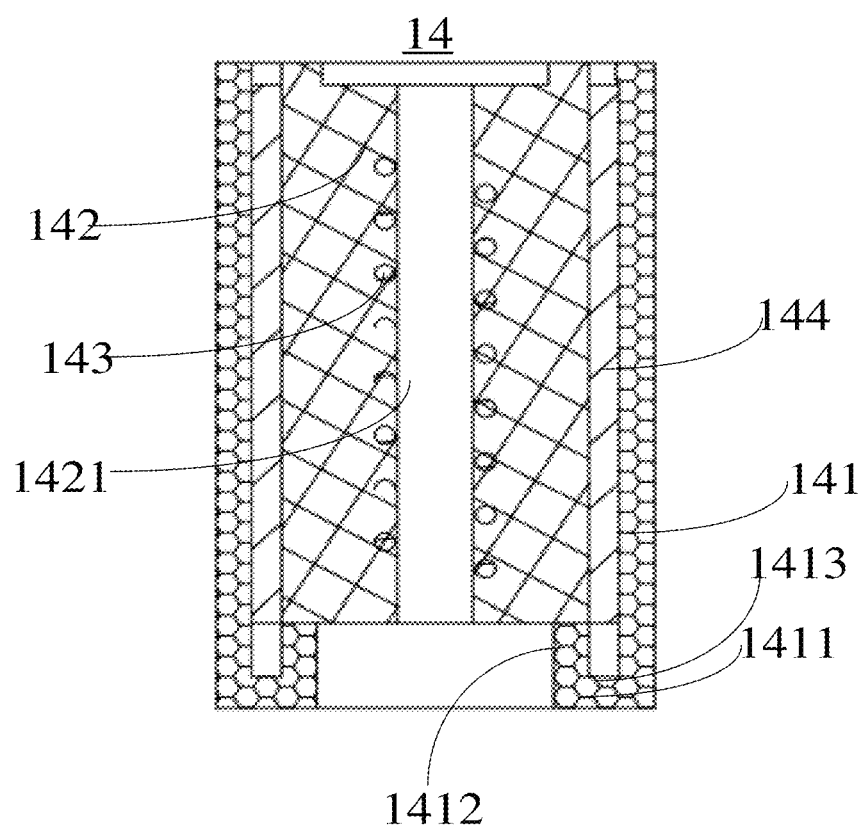
FIG. 8 is a cross-sectional view of an air heating assembly according to one embodiment of the present application.

Specifically, please refer to FIG. 7 and FIG. 8, FIG. 7 is an enlarged view of an air heating assembly according to one embodiment of the present application. FIG. 8 is a cross-sectional view of an air heating assembly according to one embodiment of the present application. The air heating assembly 14 includes a supporting tube 141, a heat retention part 142, a heating element 143 and a heat insulating layer 144. The heating element 143 is disposed inside the heat retention part 142. The air heating assembly 14 includes the supporting tube 141, the heat insulating layer 144, the heat retention part 142, and the heating element 143 from outside to inside. It should be noted that the air heating assembly 14 of the present application can ensure that a temperature of the heated air can reach 300 ☐ to 400 ☐ so as to ensure taste of the cigarette 100.

Wherein the supporting tube 141 is configured to have a hollow cylinder structure. A material of the supporting tube 141 can be consist of ceramics. The supporting tube 141 is disposed around an outer surface of the heat storage body 142. Furthermore, a limiting step 1411 having a ring shape is configured on an inner wall of one end of the supporting tube 141, a limiting protrusion 1412 having a ring shape is configured on an inner end surface of one end of the limiting step 1411, the limiting step 1411, the limiting protrusion 1412 and the supporting tube 141 share a same central axis; a gap 1413 having a ring shape is formed between the limiting protrusion 1412 and the inner wall of the supporting tube 141, one end of the heat insulating layer 144 is inserted in the gap 1413, one end of the heat storage body 142 and one end of the limiting protrusion 1412 abuts against each other.

Wherein the heat insulating layer 144 is configured to have a hollow cylinder structure. A material of the heat insulating layer 144 can be consist of fibers or ceramics. The thermal conductivity of the heat insulating layer 144 is smaller than 0.2 W/m·K. It can be understood that in one embodiment, the heat insulating layer 144 can be consist of heat insulating cotton. Furthermore, the heat insulating layer 144 is disposed between the supporting tube 141 and the heat retention part 142.

Wherein an outline of the heat retention part 142 is generally cylindrical in shape, a plurality of air heating passages 1421 are arranged in the heat retention part 142. Furthermore, the heat retention part 142 includes a first end 1422 and a second end 1423 disposed opposite to each other, each of the air heating passages 1421 passes through the heat retention part 142 along a direction from the first end 1422 to the second end 1423. The heat retention part 142 can be consist of sintered silicon dioxide, sintered alumina, sintered silicon nitride or sintered silicon carbide.

In one embodiment, each of the air heating passages 1421 can be a through hole provided in the heat retention part 142, the through hole passes through the heat retention part 142 along a direction from the first end 1422 to the second end 1423. That is to say, a cross section of the air heating passage 1421 is a closed pattern. Specifically, each of the air heating passages 1421 is configured along the central axis of the heat retention part 142. It can be understood that in the embodiment, each of the air heating passages 1421 extends in a straight line. Each of the air heating passages 1421 can extend in a curved and circuitous way, specifically it can extend in a spiral or wavy shape, so as to extend heating route.

In another embodiment, each of the air heating passages 1421 can be a concave provided in a sidewall of the heat retention part 142, the concave passes through the heat retention part 142 along a direction from the first end 1422 to the second end 1423. That is to say, the cross section of the air heating passage 1421 is a semi-closed pattern.

The heating element 143 is configured to heat the gas passing by the air heating passage 1421. The heating element 143 is disposed inside the heat storage body 142 and integrally formed together with the heat storage body 142 by sintering. Wherein the heating element 143 is a metal heating coil, and the metal heating coil is configured to be a hollow spiral pipe shape. Two wiring pins configured for current access are arranged on the end of the heating element 143.

Figure 9:
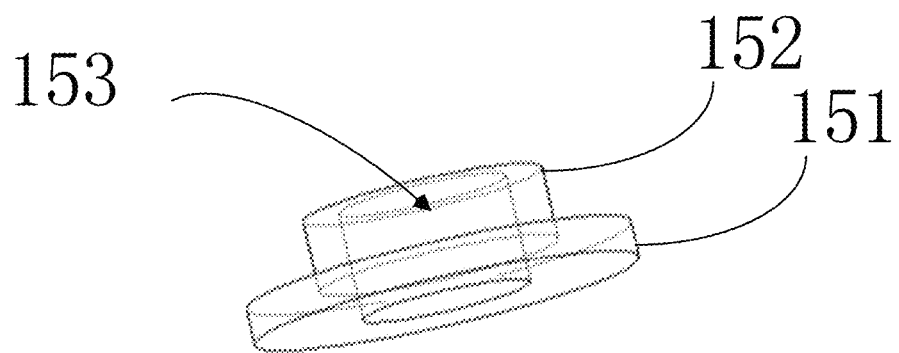
FIG. 9 is an enlarged view of an air intake structure according to one embodiment of the present application.

Combining FIG. 9, FIG. 9 is an enlarged view of an air intake structure according to one embodiment of the present application. The air intake structure 15 is a T-shaped air intake tube, which is inserted in one end of the receiving tube 12 and abuts against the end of the heat retention part 142. Furthermore, the air intake structure 15 includes a ring-shaped substrate 151 and a connecting tube 152 disposed on the ring-shaped substrate 151. The ring-shaped substrate 151 and the connecting tube 152 are vertically connected and coaxially arranged. The connecting tube 152 is inserted in and connected to one end of the lower tube chamber 102 of the heat insulating tube 11 away from the upper tube chamber 102. The ring-shaped substrate 151 abuts against one end of the heat insulating tube 11, one end of the connecting tube 152 is connected to the end of the air heating assembly 14. An air inlet opening 153 is provided in the air intake structure 15, and the air intake opening 153 is connected with the air heating passages 1421. A sealing cap 16 is disposed between an outer sidewall of the air intake structure 15 and an inner sidewall of the lower tube chamber 102.

In an electronic cigarette device of one embodiment of the present application, the power supply module 20 is electrically connected to the heating module 10. Wherein the power supply module 20 includes a battery assembly 201 and a driving circuit 202. The battery assembly 201 is electrically connected with the driving circuit 202, and the driving circuit 202 is electrically connected with the air heating assembly 14 to provide different driving voltages so as to control heating power of the air heating assembly 14.

In the embodiment, the air is heated to a default temperature by the air heating assembly, and the heated air is used to heat cigarettes to improve heating uniformity, so that local overheating can be prevented, thus improving taste and user's experience. Furthermore, the heat retention part 142 of the air heating assembly 14 of the embodiment has a function of heat storage, thus improving heating efficiency.

Figure 10:
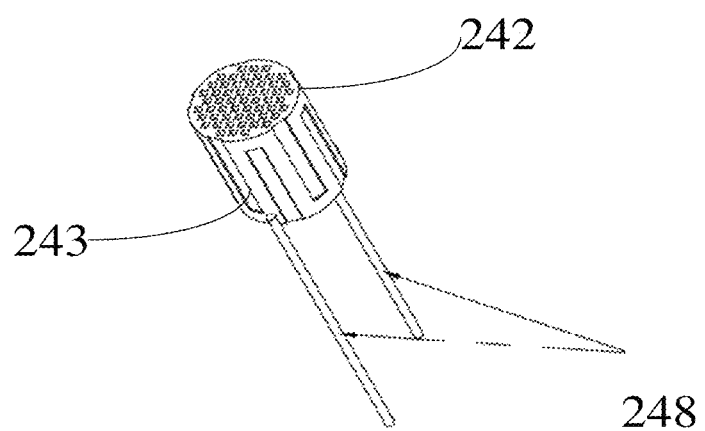
FIG. 10 is a structural schematic diagram of an air heating assembly according to another embodiment of the present application.

Moreover, please refer to FIG. 10, FIG. 10 is a structural schematic diagram of an air heating assembly according to another embodiment of the present application. Wherein differences between the air heating assembly 24 shown in FIG. 10 and the air heating assembly 14 shown in FIG. 7 and FIG. 8 are as below: a heating element 243 of the air heating assembly 24 shown in FIG. 10 is disposed on an outer surface of the heat retention part 242, and the heating element 243 is a resistance heating circuit, and the resistance heating circuit is coated on the outer surface of the heat retention part 242.

It should be noted that the air heating assembly 24 shown in FIG. 10 and the air heating assembly 14 shown in FIG. 7 and FIG. 8 only differ in where the heating element 143 or 243 are located on the heat retention part 142 or 242 and materials of heating element 143 or 243. However, as shown in FIG. 7 and FIG. 8, the air heating passages 1421, the supporting tube 141 and the heat insulating layer 144 can also be configured in the air heating assembly 24 shown in FIG. 10, and arrangement of the air heating passages 1421, the supporting tube 141 and the heat insulating layer 144 is the same as the air heating assembly 14 as shown in FIG. 7 and FIG. 8, detailed descriptions are omitted herein.

As shown in FIG. 10, in this air heating assembly 24, the resistance heating circuit is coated on the outer surface of the heat retention part 242. In one embodiment, the resistance heating circuit can be mainly made of tungsten paste.

Similarly, the heat retention part 242 and the heating element 243 are integrally formed by sintering. The resistance heating circuit mainly made of tungsten paste and the heat retention part 242 consisted of high purity alumina are sintered together at a high temperature of 1600 □, the heating element 243 and the heat retention part 242 are integrally formed, therefore great adhesion and reliability are ensured. In addition, the air heating assembly 24 further includes electrode traces 248, and the electrode traces 248 are made of conductive materials with a temperature resistance greater than 600 □.

Figure 11:
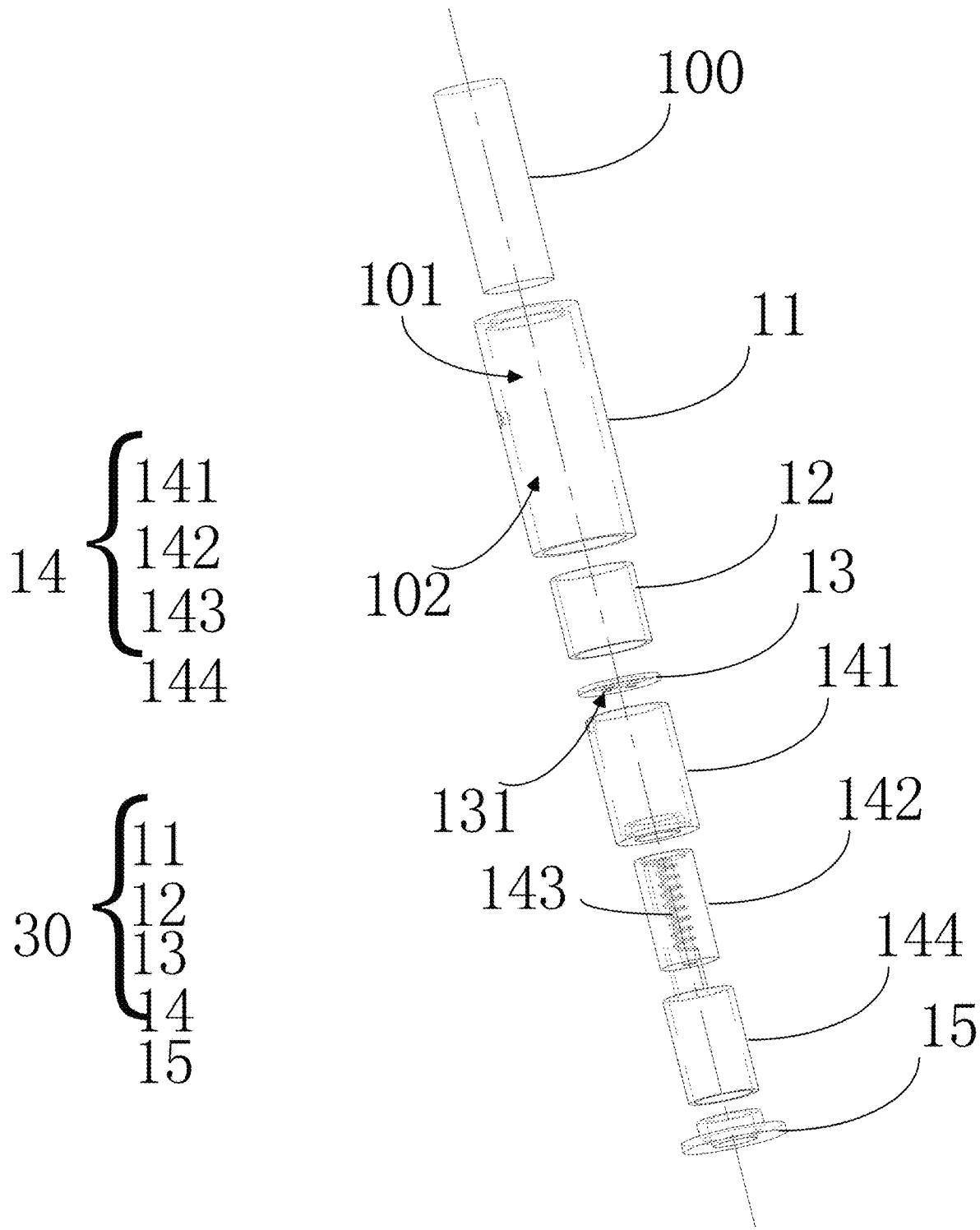
FIG. 11 is a structural schematic diagram of a controllable heating module according to another embodiment of the present application.
Figure 12:
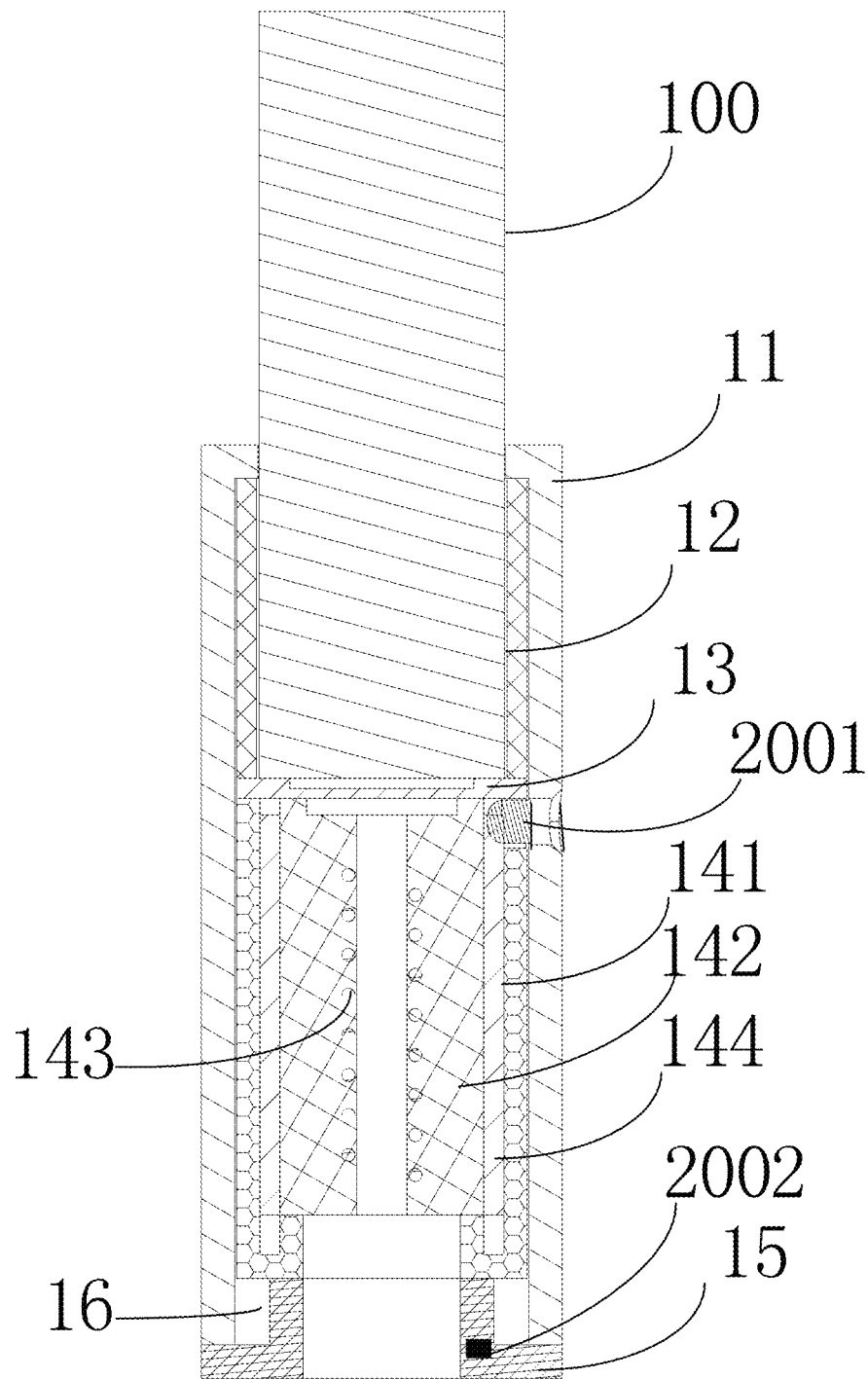
FIG. 12 is a cross-sectional view of a controllable heating module according to another embodiment of the present application.
Figure 13:
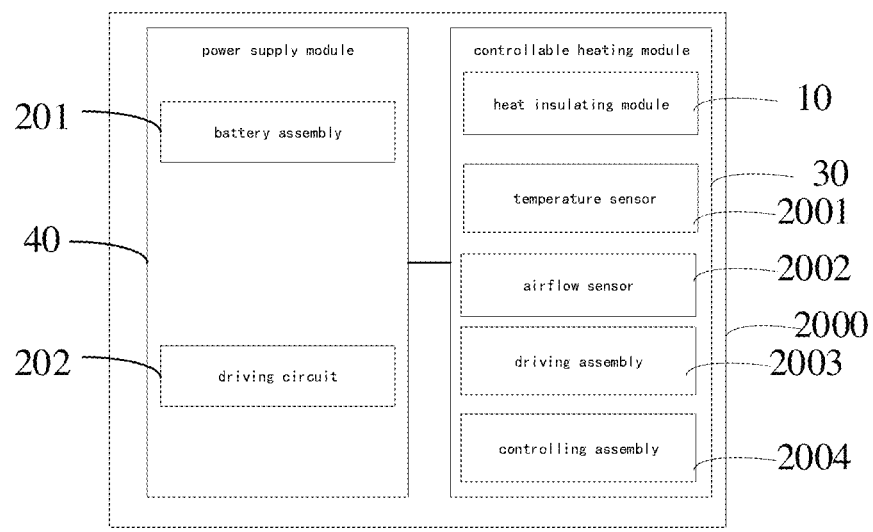
FIG. 13 is a structural schematic diagram of an electronic cigarette device according to another embodiment of the present application.

Moreover, please refer to FIG. 11 to FIG. 13 at the same time, FIG. 11 is a structural schematic diagram of a controllable heating module according to another embodiment of the present application. FIG. 12 is a cross-sectional view of a controllable heating module according to another embodiment of the present application. FIG. 13 is a structural schematic diagram of an electronic cigarette device according to another embodiment of the present application. The controllable heating module 30 is applied in the electronic cigarette device 2000. The controllable heating module 30 is assembled with the power supply module 40 to form an electronic cigarette device 2000. The controllable heating module 30 is configured to heat but not burn the cigarette to produce the smoke.

Wherein the controllable heating module 30 includes the heating module 10 mentioned as before, and includes a temperature sensor 2001, an airflow sensor 2002, a driving assembly 2003 and a controlling assembly 2004. Wherein the temperature sensor 2001 is disposed on an inner wall of the lower tube chamber 102 of the heating module 10, and the temperature sensor 2001 is configured to obtain a temperature information of the heating module 10. The airflow sensor 2002 is arranged in the air intake structure 15 of the heating module 10, and the airflow sensor 2002 is configured to detect airflow information of the air entering the air intake structure 15. The controlling assembly 2004 is electrically connected with the driving assembly 2003. The controlling assembly 2004 is configured to control the heating power of the heating module 10 according to the temperature information, and to control heating power of the heating module 10 according to the airflow information.

In one embodiment, an opening is provided in a sidewall of the end of the supporting tube 141 facing the receiving tube 12. The opening is configured to set the temperature sensor 2001 so as to detect temperature of the air heated by the air heating assembly 14.

The power supply module 40 includes a driving circuit 202 and a battery assembly 201. The battery assembly 201 is connected with the driving circuit 202, and the driving circuit 202 is electrically connected with the driving assembly 2003.

In the embodiment, air is heated to a default temperature by the air heating assembly, and the heated air is used to heat cigarettes to improve heating uniformity, so that local overheating can be prevented, thus improving taste and user's experience.

The above description provides a detailed introduction to the heating module, the controllable heating module and the electronic cigarette device of the present application. In this disclosure, specific examples are applied to explain principle and embodiments of the application. The description of the above embodiments is only used to help understand the application. At the same time, for those skilled in the art, according to the thought of the present disclosure, there will be changes in the specific embodiments and application scope. In conclusion, the content of the specification should not be understood as the limitation of the application.

What is claimed is:

1. An air heating assembly, comprising:
    a heat retention part, wherein a plurality of air heating passages are arranged in the heat retention part; and
    a first heating element disposed inside and integrally formed with the heat retention part by sintering and a second heating element disposed on an outer surface of the heat retention part, wherein the second heating element is a resistance heating circuit coated on the outer surface of the heat retention part, and the first heating element and the second heating element are configured to heat gas passing by the air heating passages, and the heated air is used to heat cigarettes;
    wherein each of the air heating passages is configured along a central axis of the heat retention part, each of the air heating passages extends in a spiral or wavy shape, so as to extend a heating route;
    wherein each of the air heating passages is a concave provided in a sidewall of the heat retention part, the heat retention part comprises a first end and a second end disposed opposite to each other, each of the air heating passage passes through the heat retention part along a direction from the first end to the second end, the heat retention part consists of sintered silicon dioxide, sintered alumina, sintered silicon nitride or sintered silicon carbide.

2. The air heating assembly of claim 1, wherein the air heating assembly further comprises a supporting tube and a heat insulating layer; the supporting tube is disposed around an outer surface of the heat retention part; and the heat insulating layer is disposed between the supporting tube and the heat retention part.

3. The air heating assembly of claim 2, wherein the supporting tube is configured to have a hollow cylinder structure, and the supporting tube is disposed around an outer surface of the heat retention part.

4. The air heating assembly of claim 2, wherein a limiting step having a ring shape is configured on an inner wall of one end of the supporting tube, a limiting protrusion having a ring shape is configured on an inner end surface of one end of the limiting step, a gap having a ring shape is formed between the limiting protrusion and the inner wall of the supporting tube, wherein one end of the heat insulating layer is inserted in the gap, and one end of the heat retention part and one end of the limiting protrusion abuts against each other.

5. The air heating assembly of claim 1, wherein the second heating element is made of tungsten paste, and the heat retention part consists of high purity alumina.

6. The air heating assembly of claim 5, wherein the second heating element made of tungsten paste and the heat retention part consisting of high purity alumina are sintered together at a high temperature of 1600° C.

* * * * *